(12) United States Patent
Saito et al.

(10) Patent No.: US 7,776,214 B2
(45) Date of Patent: Aug. 17, 2010

(54) MEMBRANE ELEMENT

(75) Inventors: Kenichi Saito, Kyoto (JP); Shiro Tanso, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 270 days.

(21) Appl. No.: 11/884,903

(22) PCT Filed: Feb. 3, 2006

(86) PCT No.: PCT/JP2006/301859

§ 371 (c)(1),
(2), (4) Date: Aug. 22, 2007

(87) PCT Pub. No.: WO2006/090566

PCT Pub. Date: Aug. 31, 2006

(65) Prior Publication Data

US 2008/0251440 A1    Oct. 16, 2008

(30) Foreign Application Priority Data

Feb. 23, 2005  (JP) .............................. 2005-046378

(51) Int. Cl.
*B01D 25/00*  (2006.01)
*B01D 61/00*  (2006.01)
*C09J 9/02*  (2006.01)

(52) U.S. Cl. ............... 210/231; 210/321.75; 210/257.2; 156/359; 156/258; 156/358; 156/309.3

(58) Field of Classification Search .................. 210/231, 210/321.75, 321.84, 332, 486, 257.2; 156/20, 156/308.4, 244.27, 272.29, 258, 358, 359, 156/309.3
See application file for complete search history.

(56) References Cited

U.S. PATENT DOCUMENTS 4,197,217 A * 4/1980 Gartshore et al. .......... 502/314

(Continued)

FOREIGN PATENT DOCUMENTS

JP        567618 A       1/1981

(Continued)

OTHER PUBLICATIONS

"Testing Methods and Evaluation Results of Respective Dynamic Characteristics of Plastic Materials (12)", Japan Plastics, Jan. 2001, pp. 166 and 172-197, vol. 52, No. 1.

*Primary Examiner*—Ana M Fortuna
(74) *Attorney, Agent, or Firm*—The Webb Law Firm

(57) ABSTRACT

A membrane element in which, after membrane breakage or deterioration, the filtration plate made of a thermoplastic resin can be reused to replace the membrane with a fresh one. The membrane element comprises a filtration plate made of a thermoplastic resin and, bonded to a peripheral smooth surface thereof, a microporous filter membrane which has fine pores formed therein and employs a nonwoven fabric comprising synthetic resin fibers as a support. A hot plate having a shape corresponding to the peripheral shape of the resinous filtration plate is brought into contact with a peripheral smooth surface of the plate so as to form a recessed part in the surface. The temperature of the hot plate is regulated so as to be not higher than the melting point of the nonwoven fabric serving as the support and not lower than the Vicat softening temperature of the filtration plate made of a thermoplastic resin. The thermoplastic-resin filtration plate is pressed with this hot plate through the microporous filter membrane to bond it to the membrane.

21 Claims, 7 Drawing Sheets

U.S. PATENT DOCUMENTS

| | | | |
|---|---|---|---|
| 4,264,447 A | 4/1981 | Nicolet | |
| 4,302,270 A * | 11/1981 | Nicolet | 156/290 |
| 4,869,821 A * | 9/1989 | Korin | 210/321.64 |
| 4,996,080 A * | 2/1991 | Daraktchiev | 427/600 |
| 5,094,749 A * | 3/1992 | Seita et al. | 210/321.75 |
| 5,223,133 A * | 6/1993 | Clark et al. | 210/232 |
| 5,651,888 A | 7/1997 | Shimizu | |
| 5,772,831 A * | 6/1998 | Moro et al. | 156/309.3 |
| 6,200,536 B1 * | 3/2001 | Tonkovich et al. | 422/177 |
| 7,198,764 B2 * | 4/2007 | Fisher et al. | 422/186.04 |
| 7,211,224 B2 * | 5/2007 | Olivier | 422/101 |
| 7,404,936 B2 * | 7/2008 | Mazanec et al. | 422/198 |
| 2004/0076562 A1* | 4/2004 | Manzanec et al. | 422/211 |
| 2005/0244304 A1* | 11/2005 | Tonkovich et al. | 422/100 |
| 2005/0271563 A1* | 12/2005 | Yang et al. | 422/188 |

FOREIGN PATENT DOCUMENTS

| | | |
|---|---|---|
| JP | SHO-58-30378 | 2/1983 |
| JP | 62-24918 U | 2/1987 |
| JP | 64-39804 U | 3/1989 |
| JP | 05-068943 A | 3/1993 |
| JP | 05-137974 A | 6/1993 |
| JP | 0621840 | 8/1994 |
| JP | 6218240 | 8/1994 |
| JP | 07-024269 A | 1/1995 |
| JP | 07-024270 A | 1/1995 |
| JP | 07-024271 A | 1/1995 |
| JP | 07116482 | 5/1995 |
| JP | 08071382 | 3/1996 |
| JP | 09-141060 A | 6/1997 |
| JP | 10-202069 A | 8/1998 |
| JP | 11033363 | 2/1999 |
| JP | 11-076766 A | 3/1999 |
| JP | 11179161 A | 7/1999 |
| JP | 2000-071398 A | 3/2000 |
| JP | 3028900 B | 4/2000 |
| JP | 2001113138 | 4/2001 |
| JP | 2001-120958 A | 5/2001 |
| JP | 2001-212436 A | 8/2001 |

* cited by examiner

F I G. 3
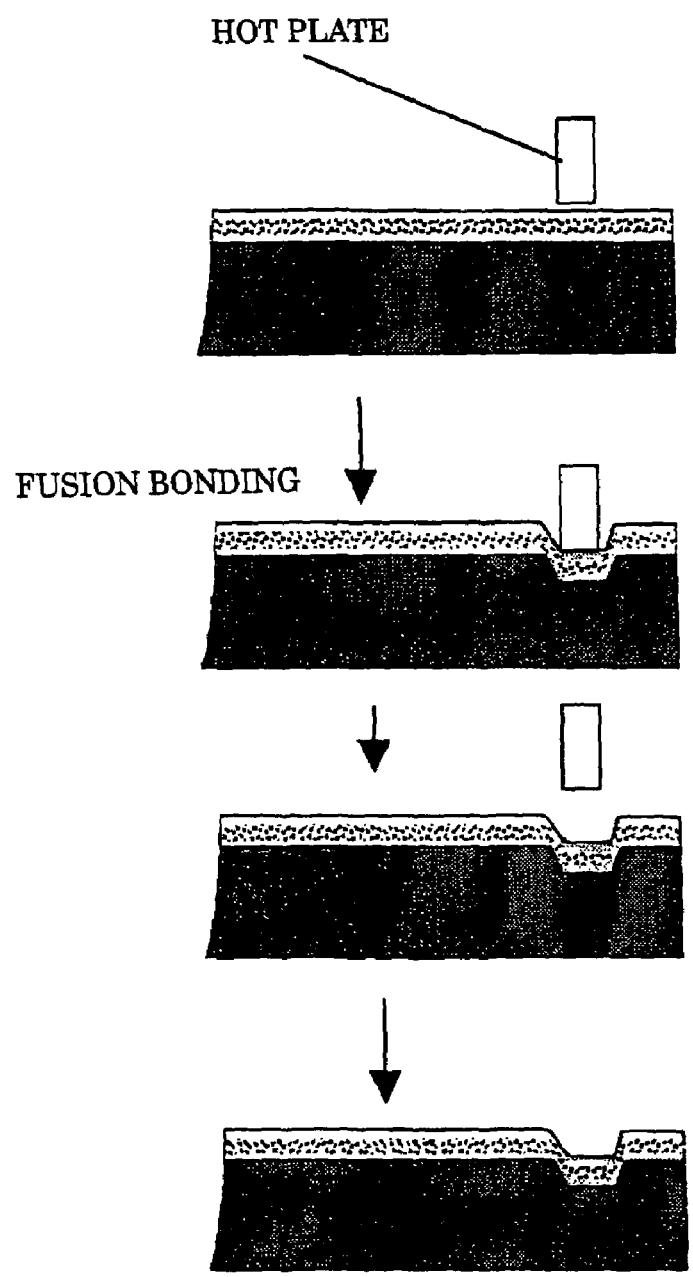

MEMBRANE ELEMENT

This Application is a 371 of PCT/JP2006/301859, filed on Feb. 3, 2006, which claim priority of Japan 2005-046378, filed on Feb. 23, 2005.

FIELD OF THE INVENTION

The present invention relates to a membrane element of a membrane separation device for use in filtration or concentration of clean water or wastewater, and more particularly to a membrane element that is capable of maintaining a stable performance even if it has an enlarged size with a short side of about 0.5 m and a long side of about 1 m.

BACKGROUND OF THE INVENTION

As a membrane separation device of this type, an immersion type membrane separation device having plural membrane elements disposed parallel to each other with a given interval (5-10 mm) is known. These membrane elements each are made up of, for example, a plate for filtration that is made of a resin and has a rectangular flat plate shape, defining a filtered water flow passage that has a first end opening to the surface of the plate and a second end communicating to a filtered water suction conduit, an organic filtration membrane covering the surface of this resin plate, and a spacer disposed between the plate and the organic filtration membrane to have a given clearance.

The membrane separation device has membrane units each made up of a plurality of the aforesaid membrane elements that have the filtered water suction conduits connected together to have a common conduit, and these membrane units are immersed in water to be treated within a treated water tank, in which a negative pressure is applied to the filtered water flow passage to filter the water to be treated by an organic filtration membrane, thus obtaining filtered water. In the aforesaid membrane separation device, an air diffuser for generating air bubbles is disposed in a lower portion of each membrane unit, so that air bubbles generated move upward between the membrane elements to generate a cross-flow. This cross-flow removes cake layer formed on the membrane surface as the filtration progresses. This membrane separation device can deal with various filtration volumes by increasing or decreasing the number of membrane elements or increasing or decreasing the effective membrane area, and thus can be used for various purposes from a small scale filtration to a large scale wastewater treatment plant.

These membrane elements are subjected to pressure by the aforesaid cross-flow and therefore a measure to prevent the organic filtration membrane, which is disposed over the surface of a resin plate for filtration, from being peeled off by fixing the organic filtration membrane to a peripheral portion of the resin plate by adhesive has been employed. However, according to this fixing manner, the organic filtration membrane is fixed to the resin plate by having adhesive impregnated in nonwoven fabric that acts as a substrate of the organic filtration membrane. Therefore, the fixing strength is varied depending on the strength, durability or chemical resistance of the cured adhesive and there may be a problem in that the fixing strength is relatively low, the working environment is deteriorated by solvent, or the drying and curing takes time. Also, there has been used a method in which the fixing is made by a tape, but this physical fixing poses a problem in that the filter membrane is easy to be peeled off. Therefore, there have been proposed manufacturing methods disclosed in such as in Japanese Patent No. 3028900 and Japanese Patent Application Laid-open No. 2001-120958.

Patent Document 1: Japanese Patent No. 3028900
Patent Document 2: Japanese Patent Application Laid-open No. 2001-120958
Patent Document 3: Japanese Patent Application Laid-open No. Hei-5-68943 (page 3 paragraph [0002])
Patent Document 4: Japanese Patent Application Laid-open No. Sho-58-30378 (page 2 right upper column line 15 to left lower column line 7)

The aforesaid Japanese Patent No. 3028900 discloses a method in which a thermoplastic resin plate and an organic filtration membrane are fusion bonded together by ultrasonic wave. The aforesaid Japanese Patent Application Laid-open No. 2001-120958 discloses a method in which plural protrusions are formed on a thermoplastic resin plate of a fusion bonded portion to have a difference in fusing strength by the protrusions, thereby suppressing the occurrence of fatigue cracking due to heat applied to a microporous organic filter membrane during fusion bonding.

Japanese Patent No. 3028900 discloses in paragraph [0010] that nonwoven fabric made of such as saturated polyester is used as a substrate of a filtration membrane 2; and when the temperature in fusion bonding this substrate to a plate for filtration 1 made of such as an ABS resin by ultrasonic wave is lower than 140° C., the plate 1 is fused and the fused resin is impregnated into the nonwoven fabric so that the filtration membrane 2 can be fixed to the plate 1; and when the temperature is higher than 140° C., both the plate 1 and the nonwoven fabric are fused so that the filtration membrane 2 can be fixed to the plate 2. However, in the fusion bonding by ultrasonic wave, which tends to cause uneven heating, controlling the temperature to below 140° C. is not preferable from the view point of securing a stable performance of a membrane element, and therefore it is assumed that the temperature was controlled to above 140° C. This is also apparent from Japanese Patent Application Laid-open No. 2001-120958 that discloses that nonwoven fabric made of synthetic resin fibers, which acts as a substrate, is partially fused and hence fatigue cracking is caused during the ultrasonic fusion bonding. Japanese Patent Application Laid-open No. 2001-120958 discloses a prior art in paragraphs [0007] to [0008] and in FIGS. 10 and 11, in which a filtration membrane 22B is pressed to a plate for filtration 22A by a rotating rotary horn 31 and fusion bonding is made by using ultrasonic wave, and the filtration membrane 22B is fusion bonded to the plate 22A by fusing the plate 22A thereby deforming the same into groove-like recesses in a water shutoff portion S. Since it discloses that fatigue cracking is easy to occur, it is assumable that the nonwoven fabric of synthetic resin fibers, which acts as the substrate, is partially fused.

SUMMARY OF THE INVENTION

Problems to be Solved by the Invention

The methods disclosed in the aforesaid Japanese Patent No. 3028900 and Japanese Patent Application Laid-open No. 2001-120958 are intended to fusion bond a thermoplastic resin plate for filtration and a filtration membrane together rather than preventing fatigue cracking due to the fusion of nonwoven fabric of synthetic resin fibers, which acts as a substrate. In Japanese Patent Application Laid-open No. 2001-120958, an effect of preventing fatigue cracking may be obtainable by providing a protrusion on a thermoplastic resin plate and ultrasonic fusion bonding is made through this protrusion. However, in a case of breakage of the filtration membrane, a membrane cannot be replaced with a new one due to the deformation of the protrusion of the thermoplastic resin plate caused during ultrasonic fusion bonding, which necessitates the replacement of all the membrane element. This is not preferable from the view point of cost and waste treatment. Also, the manufacturing of a large sized membrane element as mentioned above by the ultrasonic fusion bonding invites increase in size of a facility or plant and hence increase in cost (cf. Japanese Patent Application Laid-open No. Hei-5-68943 and Japanese Patent Application Laid-open No. Sho-58-30378).

MEANS TO SOLVE THE PROBLEMS

The present invention has been conceived in consideration of the above problems. It is an object of the present invention to provide a method of manufacturing a membrane element that is capable of easily and securely fixing a thermoplastic resin plate for filtration to a microporous organic filtration membrane, and reusing a membrane element by replacing a membrane.

Specifically, according to the present invention, there is provided a membrane element, in which a microporous filtration membrane having micro pores including nonwoven fabric made of synthetic resin fibers, which nonwoven fabric acting as a substrate, is joined to a flat surface of a peripheral part of a thermoplastic resin plate for filtration (claim 1). In the membrane element, the peripheral part of the thermoplastic resin plate has a recess on the flat surface by being joined to the microporous filtration membrane without fusing the nonwoven fabric acting as the substrate (claim 2). In each of the aforesaid membrane elements, the microporous filtration membrane is joined to the flat surface of the peripheral part of the thermoplastic resin plate by applying pressure to the thermoplastic resin plate via the microporous filtration membrane by a hot plate whose temperature is controlled (claim 3). In the membrane element claimed in claim 3, the microporous filtration membrane is joined to the thermoplastic resin plate by applying pressure to the thermoplastic resin plate via the microporous filtration membrane by the hot plate that has a frame-like shape corresponding to the shape of a joined portion of the microporous filtration membrane and the thermoplastic resin plate (claim 4). The frame-like hot plate has four rounded corners and four corners of the joined portion of the microporous filtration membrane and the thermoplastic resin plate are rounded (claim 5). In the membrane element as claimed in claim 3, the temperature of the hot plate is controlled to be equal to or lower than the fusing point of the nonwoven fabric acting as the substrate and equal to or higher than the Vicat softening temperature of the thermoplastic resin plate (claim 6). The temperature of the hot plate is controlled to be equal to or lower than the deflection temperature under load of the nonwoven fabric acting as the substrate (claim 7). In each of the aforesaid membrane elements, a material of the nonwoven fabric acting as the substrate is polyester or polypropylene, and a material of the thermoplastic resin plate is polyethylene, ABS or polyvinylchloride (claim 8).

ADVANTAGES OF THE INVENTION

In the invention (claim 1), since the microporous filtration membrane is joined to the flat surface of the peripheral part of the thermoplastic resin plate for filtration, working for joining the microporous filtration membrane to the plate is not needed, which can contribute to the cost reduction of the membrane element. The invention (claim 2), in which the peripheral part of the thermoplastic resin plate has a recess on the flat surface by being joined to the microporous filtration membrane without fusing the nonwoven fabric acting as the substrate, produces an additional advantage in that since the filtration membrane is drawn into the recess and therefore can be kept in tension, a membrane element which can contribute to obtain uniform filtration performance is obtainable. In the invention (claim 3), it is possible to obtain a membrane element enabling the filtration membrane to be kept in tension and joined to the peripheral part of the thermoplastic resin plate by the application of pressure by the hot plate. In the invention (claim 4), in addition to the above advantages, the application of the pressure by the hot plate can be achieved by one action, which contributes to the simplification of the manufacturing process and is advantageous in manufacturing a large-sized membrane element. The invention (claim 5) can contribute to the improvement of the aforesaid advantages. In the invention (claim 6), the temperature is set to be within such a range as to soften the thermoplastic resin plate while not fusing the nonwoven fabric acting as the substrate. Therefore, the nonwoven fabric and the thermoplastic resin plate are not fused and mixed together. Thus, the joining can be achieved with recesses and protrusions of the surface of the nonwoven fabric held pressed into the softened thermoplastic resin plate, and hence the thermoplastic resin plate can be joined to the microporous filtration membrane with no great change in shape of the surface of the thermoplastic resin plate while maintaining the strength of the nonwoven fabric. It is also possible to replace a polymer filtration membrane by reutilizing the thermoplastic resin plate in breakage or deterioration of the microporous filtration membrane. In the invention (claim 7), it is possible to obtain a membrane element that can maintain the strength of the nonwoven fabric with a better condition. In the invention (claim 8), it is possible to obtain various membrane elements that can produce the above advantages.

BRIEF DESCRIPTION OF THE DRAWINGS

FIG. 3 is a view illustrating an essential portion of the manufacturing procedures of a membrane element of the present invention.

DESCRIPTION OF THE REFERENCE CODES

1: Microporous filtration membrane
2: Thermoplastic resin plate for filtration
3: Hot plate
11: Substrate
12: Thermoplastic resin
21: Positioning line

DETAILED DESCRIPTION OF THE PREFERRED EMBODIMENT

Now, the description will be made for the present invention based on its embodiment.

Figure 1A:
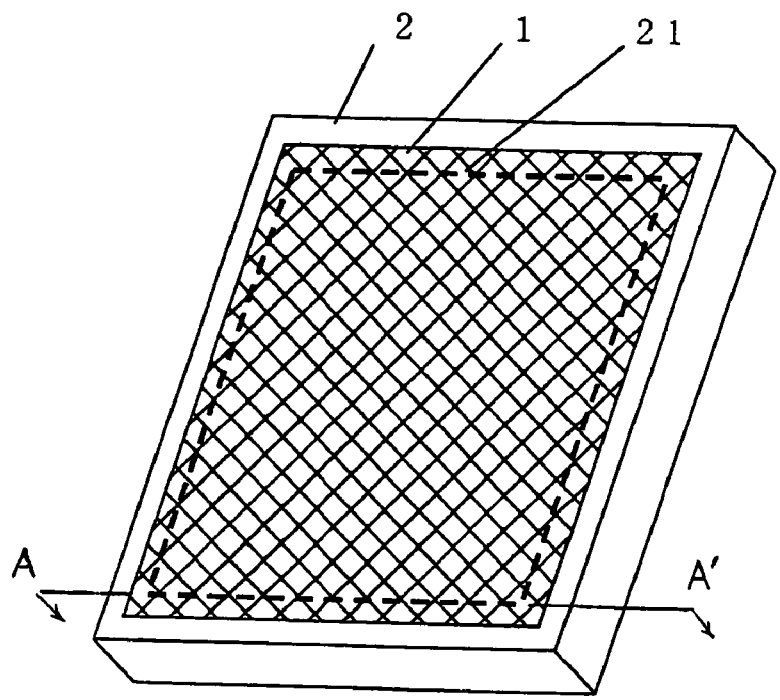
FIGS. 1 are views of a membrane element of the present invention.
Figure 1B:

FIG. 1(a) is a perspective view of a membrane element of the present invention. Specifically, as illustrated in this Figure, microporous filtration membranes 1 each having micro pores and nonwoven fabric made of synthetic resin fibers, which nonwoven fabric acting as a substrate, are respectively provided on front and rear sides of a thermoplastic resin plate for filtration 2 in tension between a positioning line 21 defined as an indicator in a peripheral part of the plate 2. Both the front and rear sides of the peripheral part of the plate 2 each have a flat surface, and a center portion inside of the peripheral part forms filtrate flow passages enabling water to be treated to pass through the microporous filtration membranes 1 in a direction orthogonal to the membrane surface, thereby obtaining filtrate. The positioning line 21 is not necessarily provided but if it is provided, it is preferable to draw a line with a marker or the like. Both the front and rear sides of the peripheral part of the plate 2 each have a flat surface, but they may be provided with protrusions in the same manner as a filtration plate for fusing a microporous filtration membrane 1 by ultrasonic wave, the microporous filtration membranes 1 can be provided in tension by the following joining method, as long as the protrusion has a flat top. The microporous filtration membranes 1 each are made up by having nonwoven fabric made of synthetic resin fibers acting as a substrate 11, and a thermoplastic resin 12 impregnated into this substrate 11, thereby forming micro pores, as illustrated in a cross sectional view taken along a line A-A' in FIG. 1(a).

Figure 2A:
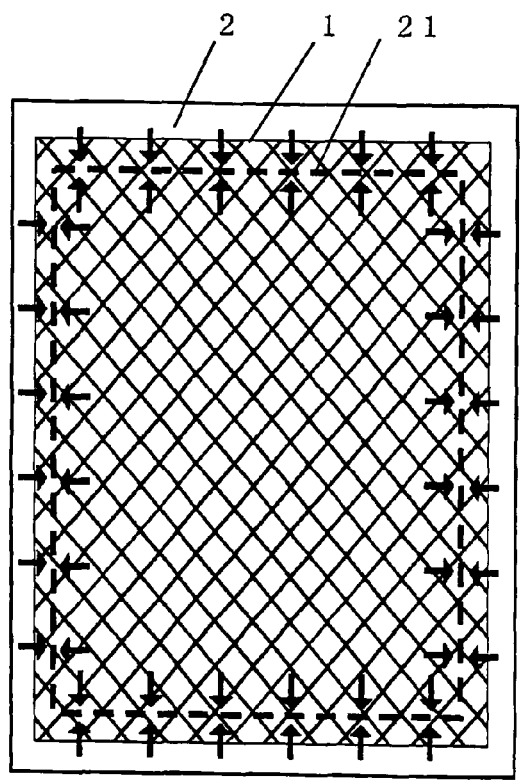
FIGS. 2 are views for explaining the manufacturing procedures of a membrane element of the present invention.
Figure 2B:
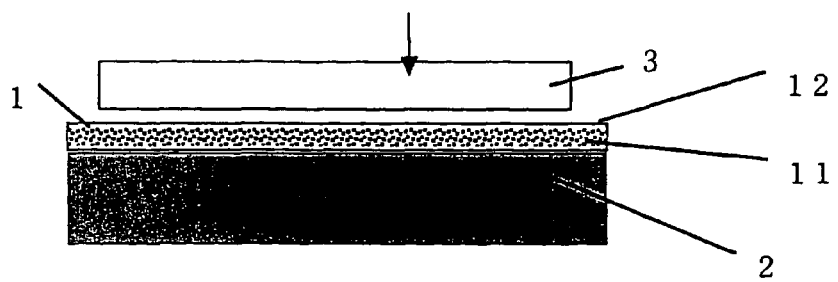
Figure 2C:
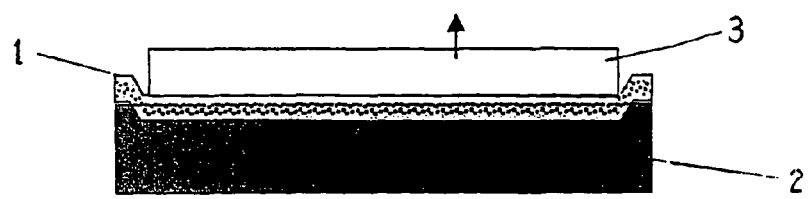

Providing each microporous filtration membrane 1 on the plate 2 in tension is achieved by joining the peripheral part of the plate 2 to the microporous filtration membrane without fusing the nonwoven fabric acting as the substrate 11. Specifically, as illustrated in FIG. 2(a), when pressed by a linear-shaped hot plate disposed along the positioning line 21, the plate 2 is softened to have a recess, into which the microporous filtration membrane 1 is drawn, as represented by arrows. FIG. 2(b) illustrates a state in which the linear-shaped hot plate 3 is located along the positioning line 21, and FIG. 2(c) illustrates a state in which the plate 2 is being pressed by the hot plate 3 via the microporous filtration membrane 1. With this arrangement, the microporous filtration membrane can be provided in tension by the recess.

The arrangement as described above, in which the linear-shaped hot plate is disposed along the positioning line 21 and the microporous filtration membrane 1 is provided in tension by applying pressure by the hot plate, is employed for the reason that when a rectangular hot plate corresponding to the rectangular positioning line 21 is employed, the microporous filtration membrane 1 can be provided in tension on the plate 2 by one action, and the microporous filtration membrane 1 is drawn into the recess formed along the positioning line 21 and thus the tensioning effect can be enhanced. In order to further enhance the tensioning effect to prevent occurrence of creases on four corners, four corners of the rectangular hot plate are rounded and a recess having rounded corners at the four corners of the jointed portion of the microporous filtration membrane 1 and the thermoplastic resin plate for filtration 2 is formed. Contrarily to this, when ultrasonic wave is employed, a rectangular horn cannot be used and therefore the respective sides must be fusion bonded independently of each other through several actions. Thus, it does not make sense to provide rounded portions to the four corners of the protrusion for the ultrasonic fusion bonding, and it is not expectable to enhance the tensioning effect or prevent occurrence of creases on four corners. Accordingly, a large-sized membrane element having a short side of about 0.5 m and a long side of about 1 m, which may pose a problem on cost and performance of providing the microporous filtration membrane 1 in tension when it is manufactured by ultrasonic fusion bonding, can be manufactured so that a membrane element for use in a large scale wastewater treatment plant can be manufactured at low cost.

The aforesaid recess may have a depth of 50 to 500 µm (30 to 300% of the thickness of the nonwoven fabric) and a width of 0.5 to 25 mm, and preferably a depth of 100 to 300 µm and a width of 1.5 to 5 mm. In a case where the four corners are rounded, a curvature radius is 2 to 20 mm and preferably 3 to 10 mm. When the depth of the recess is larger than 500 µm, the nonwoven fabric may be deteriorated due to the mechanical stress caused when it is pressed into the recess. When the depth of the recess is smaller than 50 µm, there is a problem in that the nonwoven fabric cannot be satisfactorily pressed towards the thermoplastic resin plate for filtration 2 and therefore the fusion-bonding strength may not be secured. When the width of the recess is smaller than 0.5 mm, there is a problem in that the temperature of the hot plate during fusion bonding is lowered and therefore fusion bonding at an appropriate temperature is difficult to be made. When the width of the recess is larger than 25 mm, there is a problem in that a large displacement is caused by the pressing-in is caused and hence creases may be caused on the four corners of the microporous filtration membrane 1. When a curvature radius is smaller than 2 mm, there is a problem in that creases are caused on the four corners of the microporous filtration membrane 1. When the curvature radius is larger than 20 mm, there is a problem in that an effective membrane area of the microporous filtration membrane 1 is decreased although the occurrence of creasing can be prevented. The method of measuring the depth of the recess will be hereinafter described.

As an example of the microporous filtration membrane 1, a Yumicron membrane manufactured by Yuasa Corporation, which has a number of micro pores with average pore size of 0.4 µm, can be used. The microporous filtration member 1 having such average pore size is called as a microfiltration membrane according to the definition of JIS K 3802. The aforesaid plate 2 as used is made of an acrylonitrile-butadiene-styrene copolymer (ABS) resin.

Figure 4:
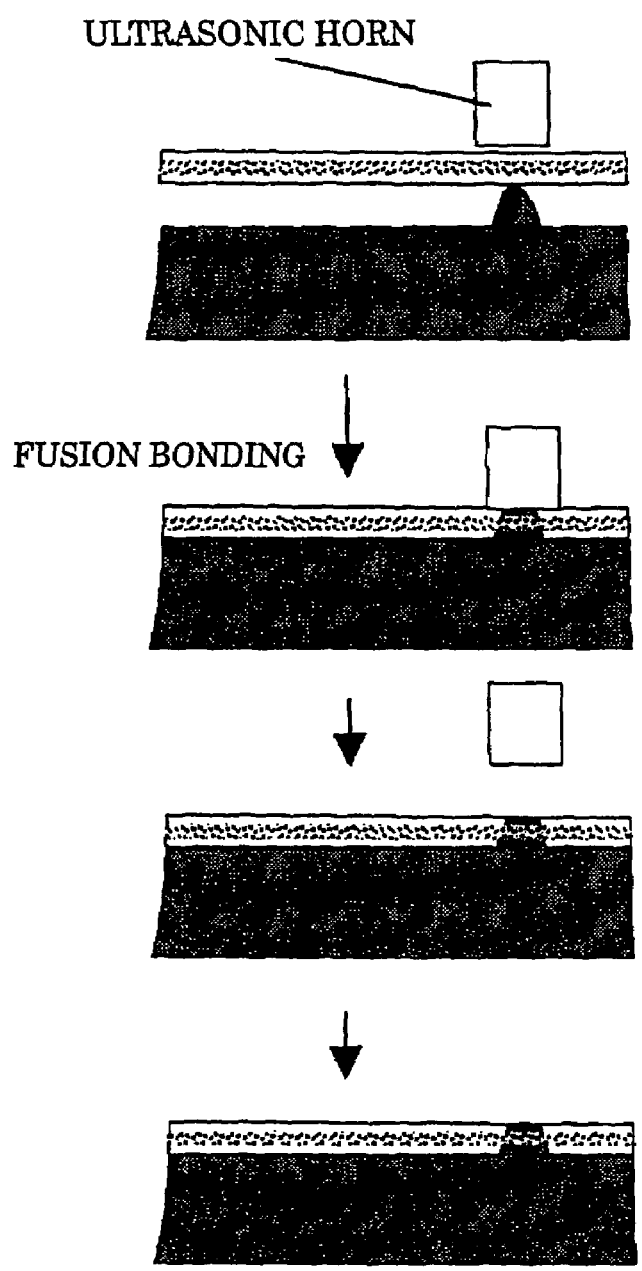
FIG. 4 is a view illustrating an essential portion of the manufacturing procedures of a conventional membrane element.

Polyethylene terephthalate acting as a substrate of the microporous filtration membrane has a fusing point of about 250° C., and when an ABS resin is used as a plate for filtration, the Vicat softening temperature is about 110° C. Therefore, as illustrated in FIG. 3, when a linear-shaped hot plate corresponding in shape to the positioning line is located above the microporous filtration membrane and is pressed against the plate for filtration via the microporous filtration membrane while controlling the temperature of the linear-shaped hot plate to be equal to or lower than the fusing point of the nonwoven fabric acting as the substrate and equal to or higher than the Vicat softening temperature of the thermoplastic resin of the plate for filtration, the microporous filtration membrane and the plate for filtration are softened. Then, the substrate is pressed into the resin of the softened plate, thereby forming a recess, and then the application of pressure is stopped so that the microporous filtration membrane and the plate for filtration can be joined together. No detailed description will be made for the Vicat softening temperature of an ABS resin as a material of the plate for filtration, since its testing method is described in the JIS K 7206 (Testing method of the Vicat softening temperature of thermoplastic resin). Contrarily to this, according to the ultrasonic fusion bonding, as illustrated in FIG. 4, an ultrasonic horn is activated on the protrusion of a plate for filtration via a microporous filtration membrane so that the microporous filtration membrane can be joined to the plate for filtration through the protrusion.

Figure 7A:
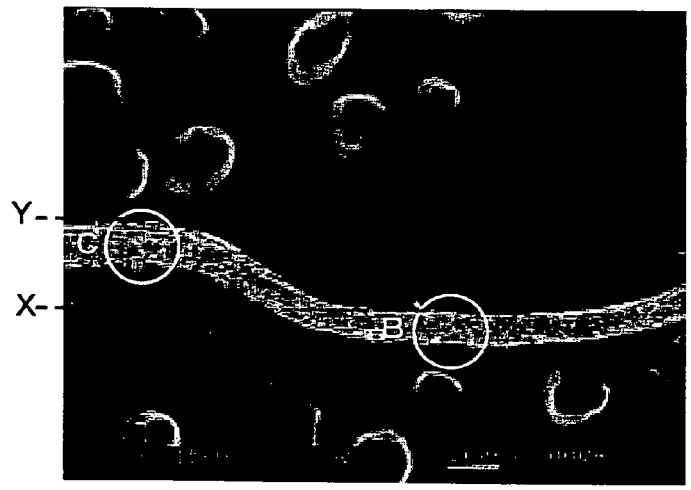
FIGS. 7 are cross sectional views of a fusion bonded portion of a membrane element of the present invention.
Figure 7B:
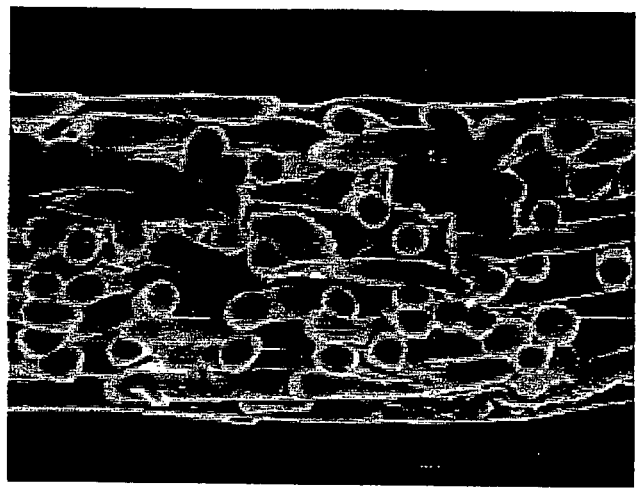
Figure 7C:
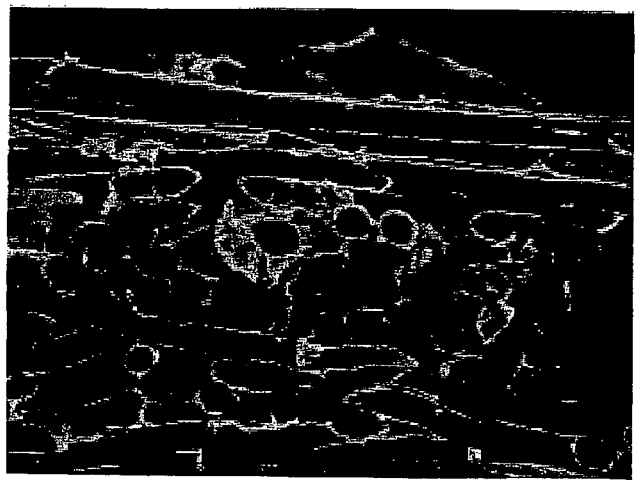
Figure 8A:
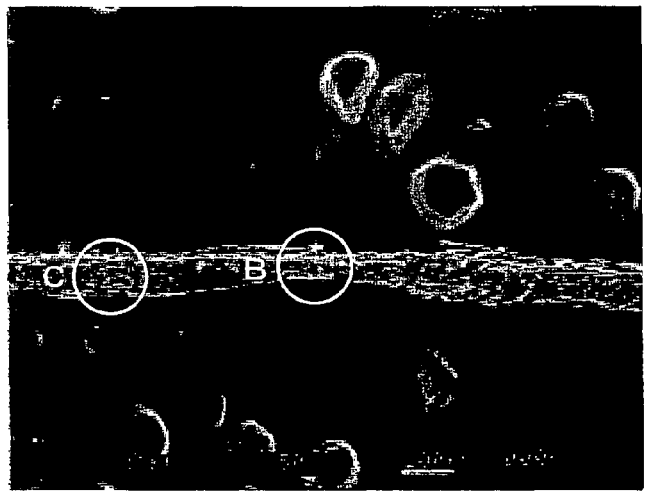
FIGS. 8 are cross sectional views of a fusion bonded portion of a conventional membrane element.
Figure 8B:
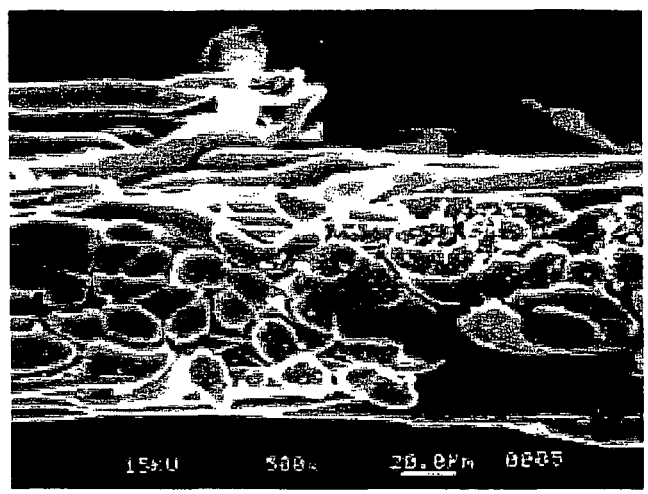
Figure 8C:
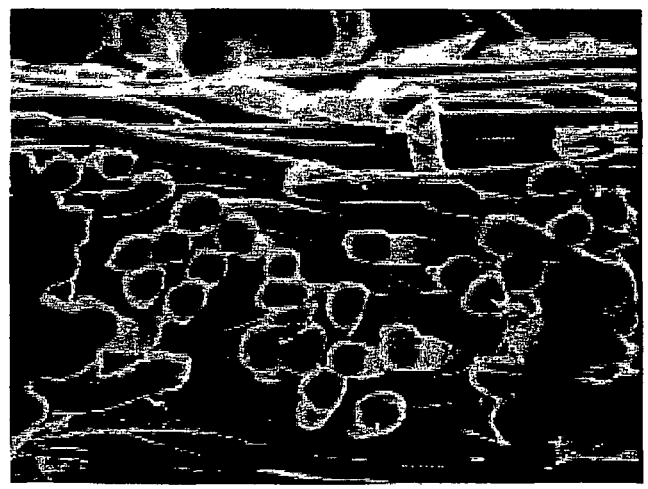

In a case where a microporous filtration membrane is fusion bonded to a plate for filtration by the linear-shaped hot plate, a recess is formed on nonwoven fabric as illustrated in a cross-sectional photograph of FIG. 7(a). As being apparent from a bottom of the recess (an enlarged photograph of a B portion of FIG. 7(a) illustrated in a cross-sectional photograph of FIG. 7(b)) and an edge of the recess (an enlarged photograph of a C portion of FIG. 7(a) illustrated in the cross-sectional photograph of FIG. 7(c)), the cross-sectional shape of fibers of the nonwoven fabric is not changed although there is a difference as to whether the fibers of the nonwoven fabric have been thickened. Contrarily to this, in a case where nonwoven fabric acting as a substrate is fusion bonded to a plate for filtration by ultrasonic wave, as being apparent from a portion to be joined to a protrusion as illustrated in a cross-sectional photograph of FIG. 8(a) (an enlarged photograph of a B portion of FIG. 8(a) illustrated in a cross-sectional photograph of FIG. 8(b)) and a portion not to be joined to the protrusion (an enlarged photograph of a C portion of FIG. 8(a) illustrated in a cross-sectional photograph of FIG. 8(c)), the cross-sectional view of fibers of the nonwoven fabric has been changed. It is assumed that the difference in cross-sectional shape of fibers of the nonwoven fabric is caused because the ultrasonic fusion bonding, which cannot control the temperature, causes deterioration of the nonwoven fabric due to heat, while the fusion bonding by the hot plate whose temperature is lower than the fusing temperature of the nonwoven fabric causes less deterioration of the nonwoven fabric due to heat. The depth of the recess in a case where the nonwoven fabric has been fusion bonded to the plate for filtration by the hot plate was measured as a distance between an upper surface of the bottom of the recess (an X portion in FIG. 7(a)) and an upper surface of the edge of the recess (a Y portion in FIG. 7(a)) upon observation of a cut plane by an electron microscope. It is to be noted that since the microporous filtration membranes 1 were placed upright on an adhesive tape when taking a cross-sectional photograph, holes opened through the adhesive tape are shown on the upper and lower sides of the nonwoven fabric, but the holes are not related to the present invention.

EXAMPLE 1

In joining a microporous filtration membrane to a plate for filtration of an ABS resin by using a linear-shaped hot plate having a width of 20 mm and a length of 500 mm, while the temperature of the hot plate was controlled to be equal to or lower than about 250° C. and equal to or higher than about 110° C., that is, to have a relation of: the fusing point of the nonwoven fabric acting as the substrate>the temperature of the hot plate≧the Vicat softening temperature of the thermoplastic resin plate for filtration, the temperature of the hot plate was controlled to 210° C., 180° C. and 150° C., respectively, and a pressure of 0.5 MPa was applied to the microporous filtration membrane for 10 seconds and then the microporous filtration membrane was joined to the plate for filtration. Then, an investigation was made by a tensile test to observe whether the microporous filtration membrane is peeled off from the plate for filtration. According to the test result, it has been found that, with a width of 20 mm and less than 15N, the microporous filtration membrane is not peeled off from the resin plate, and this is a value tolerable for practical use as a membrane element. From this, it is assumed that, when the temperature of the hot plate is controlled within the above range, a mixed resin of a thermoplastic resin of the plate for filtration and a resin of the microporous filtration membrane (mainly the resin of the plate) is generated in a joined portion, and recesses and protrusions of the surface of the nonwoven fabric of the substrate are pressed into the plate for filtration so that the strength of the joined portion can be secured without decreasing of the strength of the substrate. Upon measuring the tensile strength according to JIS L 1913 (general short fiber nonwoven fabric testing method) in the aforesaid tensile test, it has been found that a product of the present invention made by fusion bonding by using the hot plate has a strength about 30% higher than a conventional product made by ultrasonic fusion bonding.

EXAMPLE 2

In Example 1, in which the temperature of the hot plate is set to be equal to or lower than about 250° C., which is the fusing point of the nonwoven fabric, the microporous filtration membrane and the plate for filtration are subjected to thermal stress and mechanical stress in the recess formed by the application of pressure by the hot plate. An influence on deterioration of the substrate by thermal stress is suppressed by controlling the temperature of the hot plate to the aforesaid temperature, but no consideration is taken to the deterioration of the substrate due to the mechanical stress. Therefore, in Example 2, in order to suppress the deterioration of the substrate due to the mechanical stress, a test specimen of the same material as that of the substrate is subjected to JIS K 7191-2 (Plastic- Deflection Temperature Under Load Test-Section 2: Plastic and Ebonite) to determine the deflection temperature under load so that the temperature of the hot plate is controlled to be equal to or lower than the deflection temperature under load. Specifically, the testing was conducted according to the B method specified by the JIS for a test specimen manufactured from the aforesaid polyethylene terephthalate, and it was found that the deflection temperature under load was about 195° C. In view of this deflection temperature under load, the temperature of the hot plate is set to be equal to or lower than about 250° C., which is the fusing point of the nonwoven fabric of polyethylene terephthalate acting as the substrate, and preferably equal to or lower than about 195° C.

Figure 5:
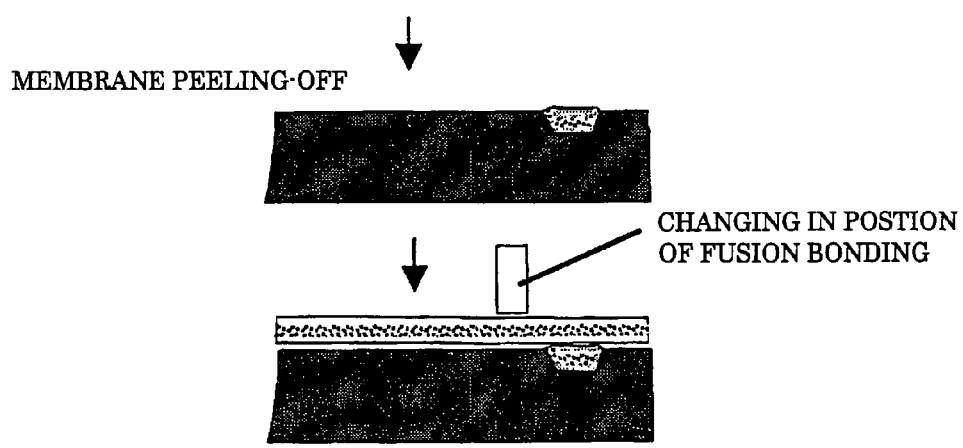
FIG. 5 is a view for explaining the replacement of a microporous filtration membrane in a membrane element of the present invention.
Figure 6:
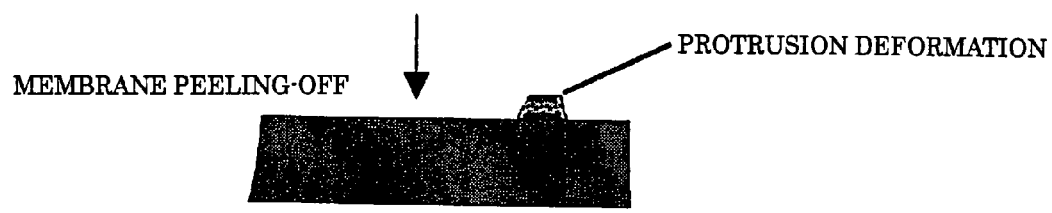
FIG. 6 is a view for explaining the replacement of a microporous filtration membrane in a conventional membrane element.

Now, the description will be made for the case in which a microporous filtration membrane of the thus manufactured membrane element is to be replaced. In the present invention, as illustrated in FIG. 5, even if the used microporous filtration membrane is removed from the plate for filtration, the joined surface remains flat and therefore a positioning line is provided in a position different from the peeled-off position. The hot plate is placed on this positioning line to join a new microporous filtration membrane so that the membrane element can be reused by the replacement of the microporous filtration membrane. Contrarily to this, according to the ultrasonic fusion bonding, as illustrated in FIG. 6, when the used microporous filtration membrane is peeled off from the plate, a deformed protrusion is left on the peeled-off position, which necessitates to reshape this protrusion to enable the ultrasonic fusion bonding for reuse (in a case where the fusion bonding is made by using the hot plate with the aforesaid protrusion acting as the positioning line, the protrusion is to be removed to have a flat surface before the replacement of the microporous filtration membrane). This is not preferable from view point of the cost for reuse, and is still not preferable from the view point of the waste treatment and cost even in a case where the membrane element is discarded and replaced with a new one.

As described above, in comparison between the present invention and the ultrasonic fusion bonding conventionally performed, both commonly perform thermal fusion bonding, but the present invention produces advantages which may not be achieved by the ultrasonic fusion bonding, in which the microporous filtration membrane can be joined to the plate while keeping the microporous filtration membrane in tensed state, providing the microporous filtration membrane in tension can be made by one action, and the microporous filtration membrane can be replaced with a new one.

In the aforesaid Examples, nonwoven fabric of polyethylene terephthalate is used for the substrate, but nonwoven fabric of synthetic fibers of such as other polyester or polypropylene. When polypropylene, which has a fusing point of 170° C., is used, the temperature of the hot plate is set to be equal to or lower than 170° C. and preferably equal to or lower than 130° C., which is its deflection temperature under load. Although an ABS resin is used for the plate for filtration, a polyvinylchloride or polyethylene plate may be used. When polyvinylchloride is used, the temperature of the hot plate is better to be set to be equal to or higher than 80° C., which is its Vicat softening temperature. When polyester is used and it is, for example, high density polyethylene, the temperature of the hot plate is better to be set to be equal to or higher than 100° C., which is its fusing point. In either case, the temperature of the hot plate is controlled to be equal to or lower than the fusing point of nonwoven fabric acting as the substrate (or when the material is such as an amorphous material having no fusing point, the Vicat softening temperature is employed, and accordingly the temperature of the hot plate is set to be equal to or lower than the Vicat softening temperature) and equal to or higher than the Vicat softening temperature of a thermoplastic resin plate for filtration (when the material has a fusing point, the temperature of the hot plate is set to be equal to or lower than the fusing point).

INDUSTRIAL APPLICABILITY

As described above, the present invention has high industrial applicability since it has a feature enabling the reuse of the membrane element and the like.

The invention claimed is:

1. A membrane element comprising:
   a microporous filtration membrane having micro pores comprising a nonwoven fabric made of synthetic resin fibers as a substrate; and
   a thermoplastic resin plate for filtration,
   wherein said thermoplastic resin plate for filtration has a recess at a peripheral part of said thermoplastic resin plate and said microporous filtration membrane is joined to said thermoplastic resin plate for filtration at the inside of the recess thereof, and
   said nonwoven fabric made of synthetic resin fibers is not fused at the inside of the recess of the thermoplastic resin plate.

2. The membrane element of claim 1, wherein said recess has a depth of 30 to 300% of thickness of said nonwoven fabric.

3. The membrane element of claim 1, wherein said recess has a depth of 50 to 500 µm.

4. The membrane element of claim 1, wherein the cross-sectional shapes of said synthetic resin fibers of said nonwoven fabric are substantially the same at a bottom of said recess and at an edge of said recess.

5. The membrane element of claim 1, wherein said thermoplastic resin plate for filtration is provided in tension.

6. The membrane element of claim 1, wherein said membrane element has a size with a short side of about 0.5 m and a long side of about 1 m.

7. A membrane separation device comprising:
   a tank of water to be treated; and
   a membrane element according to claim 1, wherein the membrane element is immersed in said water to be treated.

8. The membrane separation device of claim 7, wherein said recess has a depth of 30 to 300% of thickness of said nonwoven fabric.

9. The membrane separation device of claim 7, wherein said recess has a depth of 50 to 500 µm.

10. The membrane separation device of claim 7, wherein the cross-sectional shapes of said synthetic resin fibers of said nonwoven fabric are substantially the same at a bottom of said recess and at an edge of said recess.

11. The membrane separation device of claim 7, wherein said thermoplastic resin plate for filtration is provided in tension.

12. The membrane separation device of claim 7, wherein said membrane element has a size with a short side of about 0.5 m and a long side of about 1 m.

13. The membrane separation device of claim 7, further comprising a plurality of said membrane elements disposed substantially parallel to each other with a given interval.

14. The membrane separation device of claim 7 further comprising a generator of a flow of water to be treated toward said membrane element.

15. The membrane separation device of claim 14, wherein said generator of a flow of water to be treated is an air diffuser for generating air bubbles which is disposed under said membrane element.

16. A method for preparing a membrane element comprising a thermoplastic resin plate for filtration and a microporous filtration membrane having micro pores comprising a nonwoven fabric made of synthetic resin fibers as a substrate comprising the step of:
   applying pressure to said thermoplastic resin plate via said microporous filtration membrane by a hot plate at the following conditions:
      a temperature thereby allowing the membrane to be joined to the plate at the recess lower than the fusion point of said nonwoven fabric and equal to or higher than the Vicat softening temperature of said thermoplastic resin plate; and
      at a pressure condition for forming a recess at the peripheral part of said thermoplastic resin plate.

17. The method of claim 16, wherein said recess has a depth of 30 to 300% of thickness of said nonwoven fabric.

18. The method of claim 16, wherein said recess has a depth of 50 to 500 µm.

19. The method of claim 16, wherein said recess has a width of 1.5 to 5 mm.

20. The method of claim 16, wherein said hot plate has a frame-like shape corresponding to the shape of a joined portion of said microporous filtration membrane and said thermoplastic resin plate.

21. The method of claim 16, wherein said temperature condition is equal to or lower than the deflection temperature under load of said nonwoven fabric.

* * * * *

UNITED STATES PATENT AND TRADEMARK OFFICE
CERTIFICATE OF CORRECTION

| | | |
|---|---|---|
| PATENT NO. | : 7,776,214 B2 | Page 1 of 1 |
| APPLICATION NO. | : 11/884903 | |
| DATED | : August 17, 2010 | |
| INVENTOR(S) | : Saito et al. | |

It is certified that error appears in the above-identified patent and that said Letters Patent is hereby corrected as shown below:

Column 10, lines 45-46, Claim 16, delete the following:
"thereby allowing the membrane to be joined to the plate at the recess".

Column 10, line 51, insert the following:
-- thereby allowing the membrane to be joined to the plate at the recess --.

Signed and Sealed this
First Day of March, 2011

David J. Kappos
*Director of the United States Patent and Trademark Office*